(12) United States Patent
Mukouyama et al.

(10) Patent No.: US 6,666,615 B2
(45) Date of Patent: Dec. 23, 2003

(54) SPACER AND PARTS ATTACHMENT DEVICE

(75) Inventors: Satoshi Mukouyama, Shinagawa-ku (JP); Masayuki Hirai, Shinagawa-ku (JP); Kiyoshi Onuma, Shinagawa-ku (JP); Jun Zhang, Yokohama (JP); Minoru Araki, Yokohama (JP)

(73) Assignees: Sony Corporation, Tokyo (JP); Nifco Inc., Yokohama (JP)

( * ) Notice: Subject to any disclaimer, the term of this patent is extended or adjusted under 35 U.S.C. 154(b) by 0 days.

(21) Appl. No.: 09/933,825

(22) Filed: Aug. 22, 2001

(65) Prior Publication Data

US 2002/0029652 A1 Mar. 14, 2002

(30) Foreign Application Priority Data

Aug. 25, 2000 (JP) ........................................ 2000-256297

(51) Int. Cl.⁷ ................................................ B25G 3/20
(52) U.S. Cl. ................................ 403/374.4; 403/409.1; 403/374.1; 403/374.2; 403/374.3
(58) Field of Search .......................... 403/374.1–374.4, 403/388, 409.1; 74/575, 577 S, 577 SF, 577 M, 577 R; 242/608.5, 608.6

(56) References Cited

U.S. PATENT DOCUMENTS

| | | | | | |
|---|---|---|---|---|---|
| 932,396 | A | * | 8/1909 | Kenney | 411/277 |
| 1,746,978 | A | * | 2/1930 | Winkler | 411/536 |
| 1,966,780 | A | * | 7/1934 | Wyrick | 411/536 |
| 2,796,107 | A | * | 6/1957 | Schwaiger | 411/277 |
| 2,923,339 | A | * | 2/1960 | Skidmore | 156/512 |
| 3,318,099 | A | * | 5/1967 | Sugden | 405/153 |
| 3,528,691 | A | * | 9/1970 | Matich, Jr. | 403/356 |
| 4,523,883 | A | * | 6/1985 | Peterson et al. | 477/171 |
| 4,544,312 | A | * | 10/1985 | Stencel | 411/3 |
| 4,682,906 | A | * | 7/1987 | Rückert et al. | 403/409.1 |
| 4,790,703 | A | * | 12/1988 | Wing | 411/260 |
| 5,180,268 | A | * | 1/1993 | Richardson | 411/536 |
| 5,288,191 | A | * | 2/1994 | Ruckert et al. | 411/432 |
| 5,364,214 | A | * | 11/1994 | Fazekas | 411/536 |
| 5,522,688 | A | * | 6/1996 | Reh | 411/536 |
| 5,529,424 | A | * | 6/1996 | Neubert et al. | 403/298 |
| 5,827,027 | A | * | 10/1998 | Wakabayashi | 411/283 |
| 6,364,588 | B1 | * | 4/2002 | Fujii et al. | 411/277 |
| 6,390,747 | B1 | * | 5/2002 | Commins | 411/536 |

FOREIGN PATENT DOCUMENTS

WO   WO 91/05933   *   5/1991   .................. 411/536

* cited by examiner

Primary Examiner—William L. Miller
Assistant Examiner—Ruth C. Rodriguez
(74) Attorney, Agent, or Firm—Oblon, Spivak, McClelland, Maier & Neustadt, P.C.

(57) ABSTRACT

A spacer includes a first cam having an inclined cam surface and a second cam having an inclined cam surface. The overall length of the two cams can be changed by contacting the cam surfaces together to move the cams relative to each other.

4 Claims, 8 Drawing Sheets

SPACER AND PARTS ATTACHMENT DEVICE

BACKGROUND OF THE INVENTION

1. Field of the Invention

This invention relates to a spacer and a parts attachment device for attaching a cathode ray tube (CRT) to a TV receiver cabinet while adjusting the spacing between the cabinet and the CRT without warping the cabinet.

2. Description of the Prior Art

Figure 20:
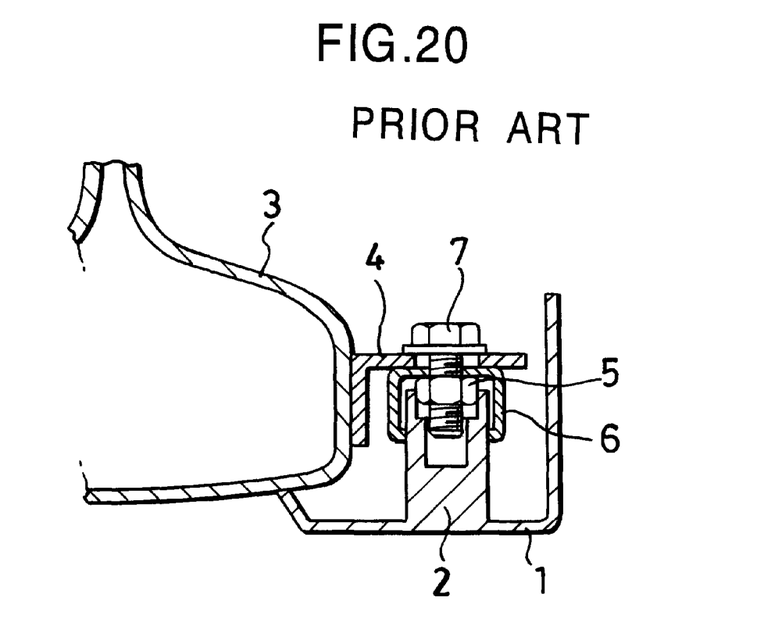
FIG. 20 is a cross-sectional view of parts of an example of a prior art CRT mounting structure.

FIG. 20 is a cross-sectional view of the parts of an example of a prior art CRT mounting structure. In FIG. 20, a boss 2 is integrally provided on the inside surface of a cabinet 1. Reference numeral 3 denotes a CRT, and numeral 4 denotes a CRT mounting flange provided on the side of the CRT 3. Located on the end of the boss 2 is a recess portion that holds a fixing screw 7 and a matching nut 5, with the nut 5 being held so that it cannot rotate. Numeral 6 denotes a fitting that is shaped like an inverted U, so it is open at the lower end. The inside of the top portion is indented to allow it to be bent down at each side, forming opposing flaps each having a cutout. The pair of cutouts is used to hold the boss 2 between the flaps.

The attachment of the CRT 3 to the cabinet 1 will now be described. First, the cabinet 1 is set level, the nut 5 is inserted into a hexagonal recess formed in the top of the boss 2, and the fitting 6 is placed over the boss 2. The CRT 3 is then positioned so that the flange 4 is on the fitting 6, and the fixing screw 7 is inserted into a hole in the fitting 6 through a hole in the flange 4 and screwed into engagement with the nut 5.

Screwing the fixing screw 7 into the nut 5 draws the nut 5 upward until it is in contact with the fitting 6, moving the fitting 6 to a position at which the gap between the cabinet 1 and the flange 4 is closed. Further tightening the fixing screw 7 deforms the top of the fitting 6 flat. moving the flaps of the fitting 6 towards each other, clamping the boss 2 between the flaps, to thereby affix the CRT 3 to the cabinet 1. This type of CRT mounting arrangement is disclosed by, for example, JP-A HEI 11-313276. Tightening the fixing screw 7 moves the fitting 6 into contact with the flange 4. Since the boss 2 is clamped between the opposing flaps of the fitting 6, the CRT 3 is attached to the cabinet 1 with an appropriate spacing being maintained between the cabinet 1 and the flange 4 that prevents the cabinet 1 being warped by the operation. However, a drawback of this configuration is that the CRT 3 is attached with a weak attaching force, which is the force by which the boss 2 is clamped by the opposing flaps of the fitting 6.

An object of this invention is to resolve the above-described weak attaching force that is a drawback of the prior art, by providing a spacer and a parts attachment device that enables parts to be securely affixed without warping the member to which the part is affixed.

SUMMARY OF THE INVENTION

To attain the above object, the present invention provides a spacer comprising a first cam having an inclined cam surface and a second cam having an inclined cam surface, with an overall length of the two cams being changed by contacting the cam surfaces together to move the cams relative to each other.

The above object is also attained by a device for attaching parts via a spacer comprising a first cam having an inclined cam surface and a second cam having an inclined cam surface, with an overall length of the two cams being changed by contacting the cam surfaces together to move the cams relative to each other.

The spacer can also include a ratchet means for preventing the overall length of the cams from decreasing. A configuration can be used in which the cams are cylindrical and the ratchet means comprises engaging teeth provided on the peripheral wall of one of the cams and a pawl provided on the peripheral wall of the other cam that engages with the engaging teeth of the first cam. Using cams that are cylindrical, the ratchet means can also comprise engaging teeth provided on the cam surface of one cam and a pawl provided on the cam surface of the other cam that engages with the engaging teeth of the first cam.

The spacer can also include a torque limiter provided on a threaded engaging portion of one cam that engages with a fixing screw, a torque of the screwing action of the fixing screw relative to the threaded engaging portion being larger than a ratchet torque of the ratchet means, so that when a cam is brought into abutment with a member by rotation of the fixing screw in the threaded engaging portion, the action of the torque limiter screws the fixing screw into the engaging portion.

The cams are moved relative to each other in a linear direction to change the overall length of the cams, and it is preferable to provide a means for coupling the two cams together, at least in their initial state.

As described in the above, in accordance with this invention, a spacer is constituted of the first and second cams, enabling the overall length of the spacer to be adjusted to match the gap between the CRT fixing flange and the cabinet. Enabling the flange to be directly attached to the cabinet by fixing screws resolves the problem of weak attaching force that is a drawback of the prior art mounting.

Further features of the invention, its nature and various advantages will be more apparent from the accompanying drawings and following detailed description of the invention.

DESCRIPTION OF THE PREFERRED EMBODIMENT

The invention will now be described with reference to the drawings. FIGS. 1 to 4 show a fixed cam used in a spacer according to a first embodiment of the invention. In the drawings, reference numeral 11 denotes a first cam that is a fixed cam. The fixed cam 11 is formed of synthetic resin, and is cylindrical in shape, comprising a large-diameter portion 12 and a small-diameter portion 15. The large-diameter portion 12 is provided with a projection 13 that extends radially from the peripheral surface of the large-diameter portion 12. Two cam surfaces 14 are provided on the upper surface of the large-diameter portion 12. Each cam surface 14 slopes up at a predetermined angle, extending 180 degrees in a clockwise direction. The peripheral surface of the small-diameter portion 15 has teeth 16 for a ratchet means. A pawl 17 that constitutes a coupling means is provided between predetermined teeth 16.

FIGS. 5 to 9 show a rotary cam used as a second cam in the spacer of the first embodiment. The rotary cam 21 is formed of synthetic resin, and comprises an outer cylinder 22, a threaded inner cylinder (or threaded engaging portion) 25, and a ceiling portion 27 that connects the top ends of the outer cylinder 22 and the threaded inner cylinder (or threaded engaging portion) 25. The lower face of the outer cylinder 22 is provided with two cam surfaces 23, each of which slopes upwards at the same angle as the cam surface 14 of the fixed cam 11, extending 180 degrees in a clockwise direction. The peripheral surface is provided with a pawl 24 to form a rachet means. The pawl 24 has teeth 24a for engaging with the teeth 16 of the fixed cam 11. These teeth 24a constitute a coupling means. The inside surface of the threaded inner cylinder (or threaded engaging portion) 25 has built-up portions 26 provided at, for example, 120-degree intervals to limit circumferential torque (i.e., the built-up portions 26 on the inside surface of the threaded inner cylinder or threaded engaging portion 25 act as a torque limiter).

Figure 1:
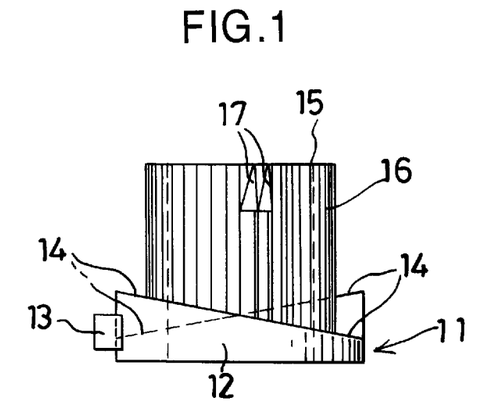
FIG. 1 is a front view of a fixed cam used in a spacer according to a first embodiment of the invention.
Figure 2:
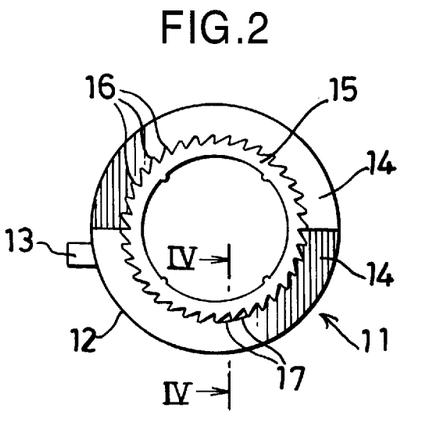
FIG. 2 is a plan view of the fixed cam of FIG. 1.
Figure 3:
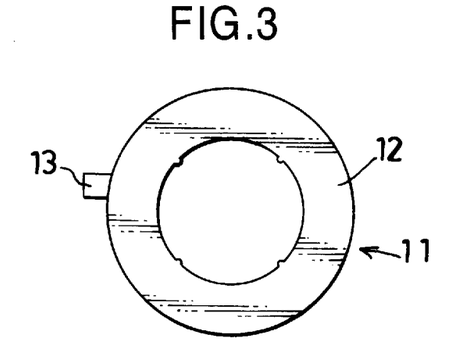
FIG. 3 is a bottom view of the fixed cam of FIG. 1.
Figure 4:
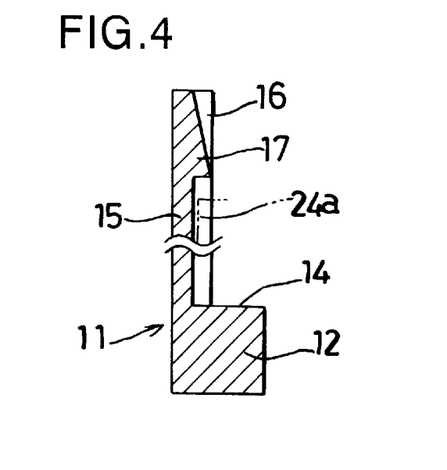
FIG. 4 is an enlarged, partial cross-sectional view along line IV—IV of FIG. 2.
Figure 5:
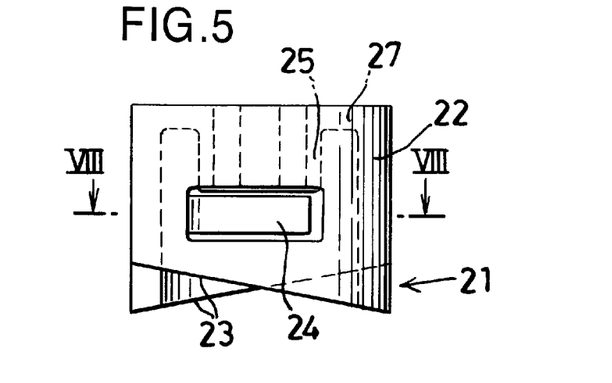
FIG. 5 is a front view of a rotary cam used in the spacer according to the first embodiment of the invention.
Figure 6:
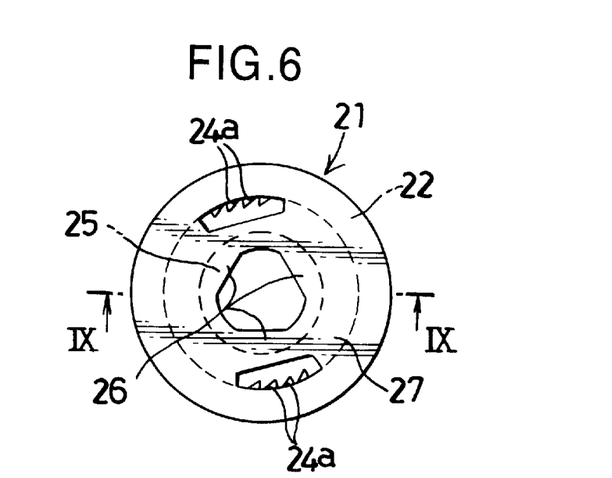
FIG. 6 is a plan view of the rotary cam of FIG. 5.
Figure 7:
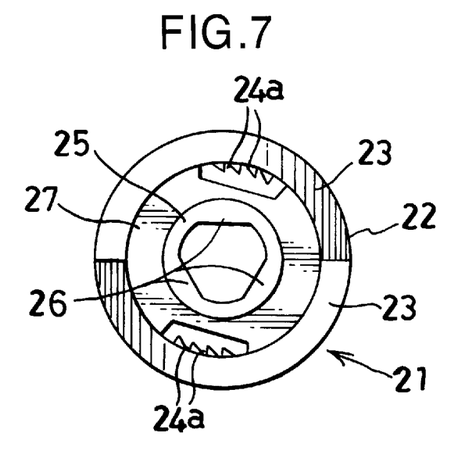
FIG. 7 is a bottom view of the rotary cam of FIG. 5.
Figure 8:
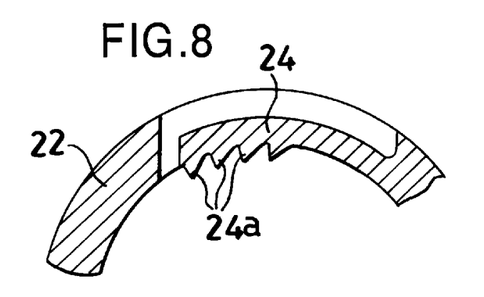
FIG. 8 is an enlarged, partial cross-sectional view along line VIII—VIII of FIG. 5.
Figure 9:
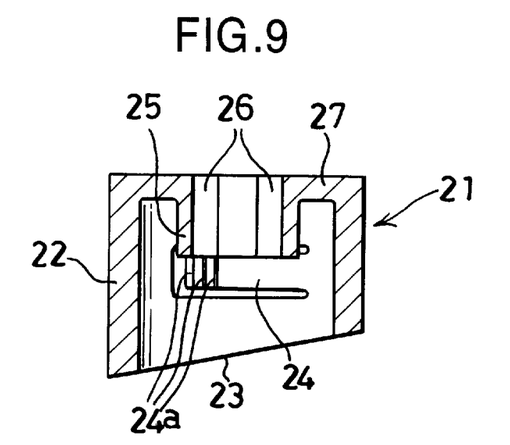
FIG. 9 is an cross-sectional view along line IX—IX of FIG. 6.
Figure 10:
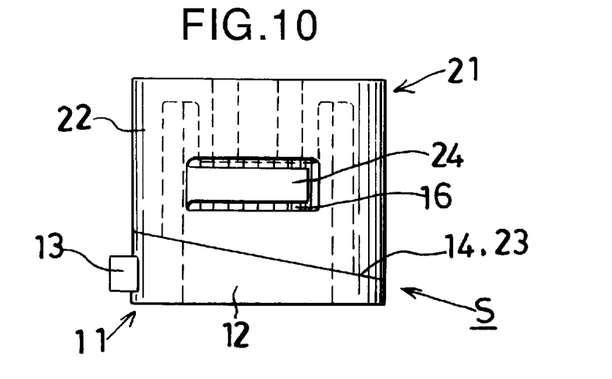
FIG. 10 is a front view showing the spacer with the rotary cam attached to the fixed cam.
Figure 11:
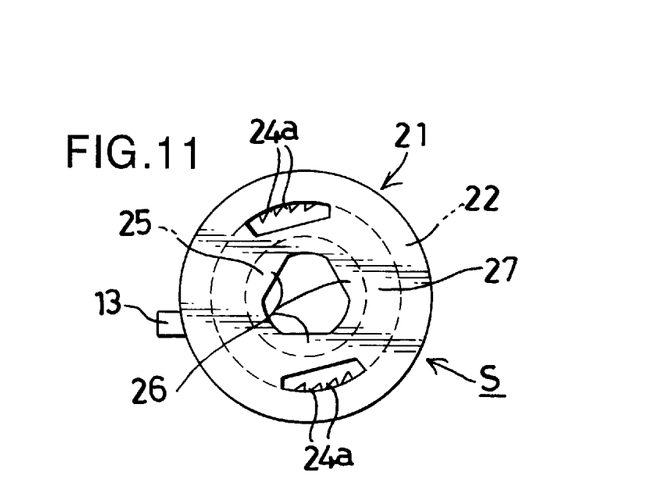
FIG. 11 is a plan view of the spacer of FIG. 10.
Figure 12:
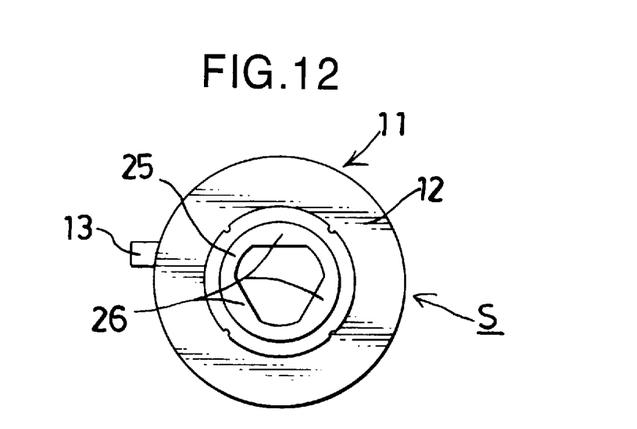
FIG. 12 is a bottom view of the spacer of FIG. 10.

FIGS. 10 to 12 show the spacer with the rotary cam 21 attached to the fixed cam 11. As shown by these drawings, the spacer is assembled so the overall length of the cam 11 and cam 21 is at the minimum, which is when the small-diameter portion 15 of the fixed cam 11 is inserted into the outer cylinder 22 of the rotary cam 21 with the teeth 16 engaged with the teeth 24a of the pawl 24 and the cam surfaces 14 and 23 pressed into contact. When the resiliency of the pawl 24 enables the teeth 24a to ride over the pawl 17, the top of the teeth 24a become positioned at the bottom of the pawl 17, as shown in FIG. 4, preventing the fixed cam 11 slipping free of the rotary cam 21. Therefore, the initial assembly state is maintained by the coupling means constituted by the pawl 17 and teeth 24a. By using the coupling means to prevent the fixed cam 11 disengaging from the rotary cam 21, the spacer S stays in its initial assembly position, in which it is easier to handle.

Figure 13:
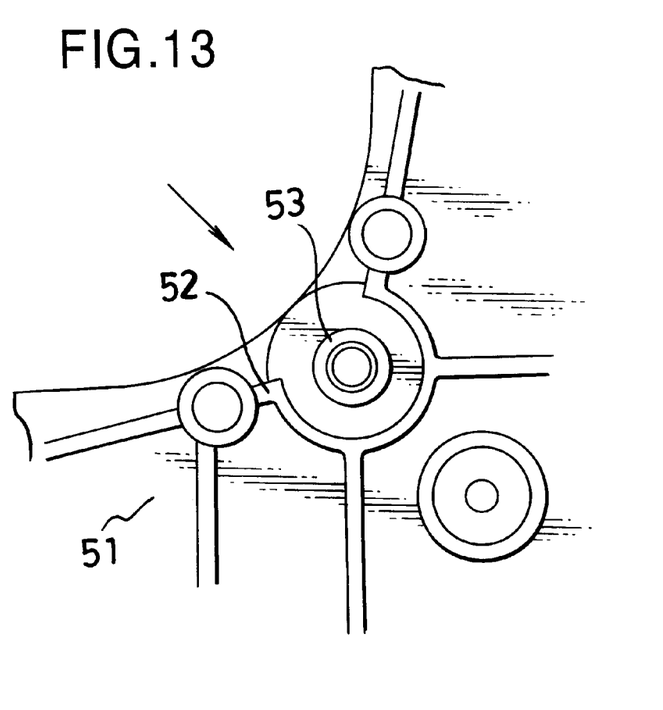
FIG. 13 is a plan view showing part of the back of a cabinet.
Figure 14:
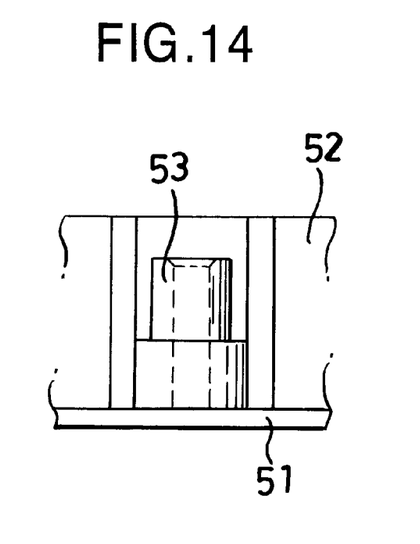
FIG. 14 is a view of the rib seen in FIG. 13, as seen from the direction indicated by the arrow.

FIG. 13 is a plan view showing part of the back of a cabinet, and FIG. 14 shows the rib of FIG. 13, as seen from the direction indicated by the arrow. In the drawings, reference numeral 51 denotes a cabinet, and numeral 52 denotes a rib formed integrally with the cabinet 51, in the shape of a cylinder open at one side when seen in plan view. The rib 52 is used to position the spacer S and control rotation of the fixed cam 11. Reference numeral 53 denotes a boss located at the center of the rib 52. The boss 53 is formed as an integral part of the cabinet 51, with an outside diameter that allows the boss to fit into the fixed cam 11.

Figure 15:
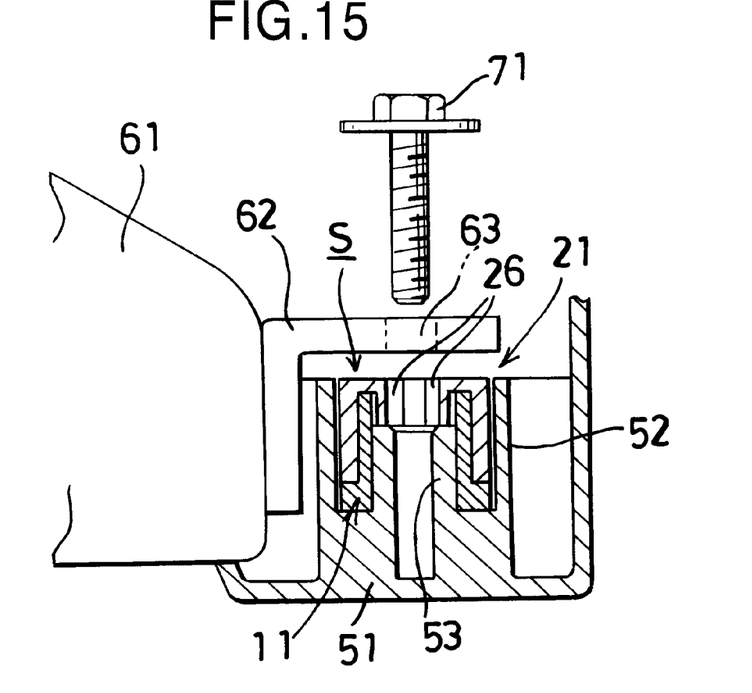
FIG. 15 illustrates the attachment of a CRT to the cabinet, using the spacer according to the first embodiment of the invention.
Figure 16:
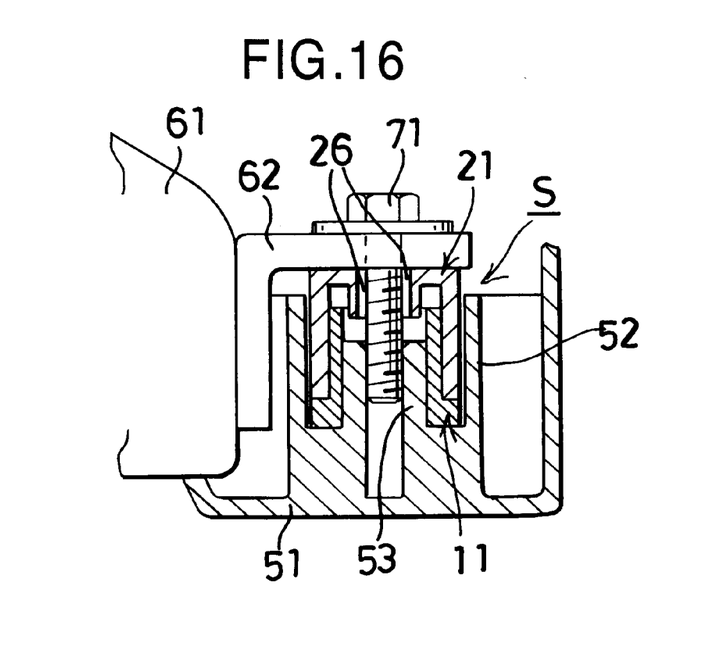
FIG. 16 is another illustration of the attachment of the CRT to the cabinet using the spacer according to the first embodiment of the invention.

FIGS. 15 and 16 show how a CRT is attached to a cabinet, using the spacer of the first embodiment of the invention. In the drawings, reference numeral 61 denotes the part or member to be attached, which is a CRT. On the side of the CRT, there is a fixing flange 62 that has a hole 63 into which a fixing screw 71 is inserted.

The attaching of the CRT 61 to the cabinet 51 will now be explained. First, as shown in FIG. 15, the cabinet 51 is placed so it is level, and the boss 53 is inserted into the fixed cam 11 of the assembled spacer S, and the spacer S is positioned inside the rib 52. Next, the CRT 61 is positioned with the flange 62 on the spacer S. The fixing screw 71 is then inserted into the hole 63 of the flange 62 and screwed into a built-up portion 26 in the inner cylinder 25 of the rotary cam 21.

When the screw 71 is being screwed into the built-up portion 26, the torque of the screwing action exceeds the ratchet torque of the ratchet means, causing the spacer S to rotate clockwise. The rotation of the fixed cam 11 is prevented by the projection 13 coming into contact with the rib 52. With the rotation of the fixed cam 11 being thus prevented, only the rotary cam 21 rotates. As the rotary cam 21 rotates, the resiliency of the pawl 24 enables the teeth 24a to ride over the teeth 16 one tooth at a time, whereby as the rotary cam 21 rotates clockwise, it is elevated as it is guided along the cam surfaces 14 and 23, gradually increasing the overall length of the spacer S. In this way, the rotary cam 21 is moved to a position at which the gap between the cabinet 51 and the flange 62 is appropriately closed.

When the rotation of the rotary cam 21 moves about two of the teeth 16 past the pawl 17 from the initial position, the pawl 17 and the teeth 24a disengage, allowing the rotary cam 21 to move axially. Also, as shown in FIG. 16, when the rotary cam 21 is pressed against the flange 62, screwing the screw 71 into the built-up portions 26 and the boss 53 clamps the flange 62 between the spacer S and the screw 71, enabling the CRT 61 to be attached securely to the cabinet 51.

Thus, as described in the above, in accordance with the first embodiment of this invention, the spacer S is comprised of a first cam 11 and a second cam 21. By pressing the cam surfaces 14 and 23 of the two cams together, the cams 11 and 21 are rotated relative to each other, thereby making it possible to increase the overall length of the spacer S, appropriately closing the gap between the cabinet 51 and the flange 62. It therefore becomes possible to securely affix the CRT 61 to the cabinet 51 without warping the cabinet 51.

Also, the spacer S is provided with a ratchet mechanism that maintains the spacer in the state in which it is attached, by preventing any shortening of the overall length of the spacer S. Moreover, the cams 11 and 21 are cylindrical, and have a ratchet mechanism provided between the peripheral walls of the cams. This configuration enables a ratchet mechanism to be provided without increasing the overall size of the spacer. The spacer S is also provided with a torque limiter, which enables the overall length of the spacer S to be readily increased to an appropriate length to fill the gap between the cabinet 51 and the flange 62. A coupling means is also provided between the cams 11 and 21, which maintains the cams in their initial assembly state, making it easier to handle the spacer and also facilitating the operation of attaching the CRT 61 to the cabinet 51.

Figure 17:
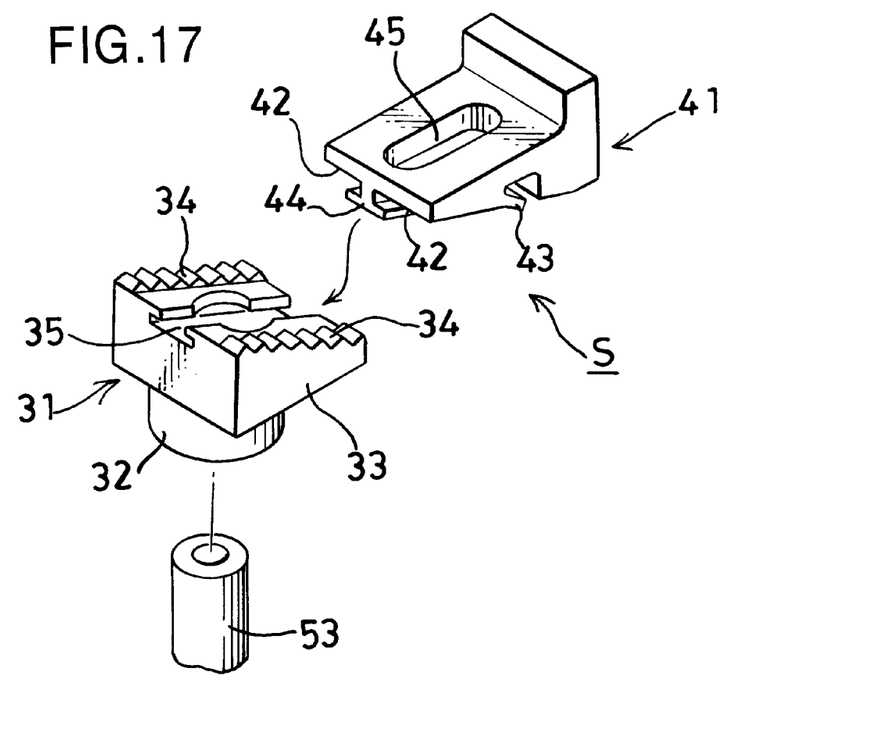
FIG. 17 is a disassembled perspective view of a spacer according to a second embodiment of the invention.

FIG. 17 is a disassembled perspective view of a spacer according to a second embodiment of the invention. Parts that are the same as, or correspond to, parts in FIGS. 1 to 16 have been given the same reference numerals or symbols, and further explanation thereof is omitted. In FIG. 17, reference numeral 31 denotes a first cam that is a fixed cam. The first cam 31 is formed of synthetic resin, and comprises a cylindrical portion 32 into which a boss 53 of a cabinet 51 is inserted, and a wedge-shaped cam portion 33. The upper surface of the cam portion 33 forms a cam surface that slopes upwards at a predetermined angle. Engaging teeth 34 are provided at each side, forming a ratchet mechanism. The cam portion 33 is also provided with a guide groove 35 and a hole 36 (FIG. 18) that communicates with the cylindrical portion 32.

Reference numeral 41 denotes a wedge-shaped second cam, formed of synthetic resin, that is movable. The lower face of the movable cam 41 is formed as a cam surface 42 that slopes upwards at the same angle as the cam engaging teeth 34. The lower surface also has a ratchet mechanism comprising pawls 43 provided at each side, and a guide member 44, preventing disengagement from the guide groove 35. The movable cam 41 has a long hole 45, which enables the hole 45 to remain in communication with the hole 36 even when the movable cam 41 is moved on the fixed cam 31. The guide mechanism constituted by the guide groove 35 and guide member 44 also forms a coupling means.

Figure 18:
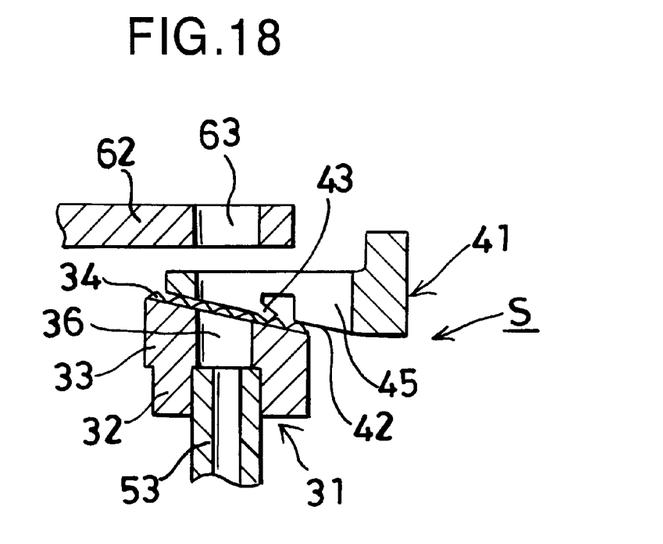
FIG. 18 illustrates the attachment of a CRT to a cabinet, using the spacer according to the second embodiment of the invention.
Figure 19:
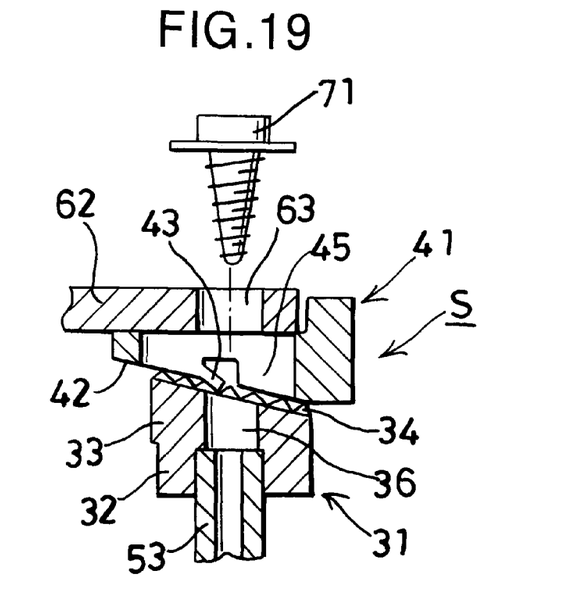
FIG. 19 is another illustration of the attachment of the CRT to the cabinet using the spacer according to the second embodiment of the invention.

FIGS. 18 and 19 illustrate the attachment of a CRT to a cabinet, using the spacer according to the second embodiment of the invention. Parts that are the same as, or correspond to, parts in FIGS. 1 to 17 have been given the same reference numerals or symbols, and further explanation thereof is omitted. FIG. 18 shows the initial assembly state, with the guide member of the movable cam 41 inserted in the guide groove of the fixed cam 31 and the teeth 34 at the lower part in engagement with the pawls 43. This initial state is maintained by the coupling (i.e. guide) means. In this initial state, the spacer S is easier to handle, since the coupling means keeps the cams together.

The attaching of the CRT 61 to the cabinet 51 will now be explained. First, as shown in FIG. 18, with the cabinet 51 (not shown) in a level position, the boss 53 is inserted into the cylindrical portion 32 of the assembled spacer S, and the CRT 61 (not shown) is positioned so that the flange 62 is on the spacer S. The gap between the movable cam 41 and the flange 62 can then be closed, as shown in FIG. 19, by pushing in the movable cam 41.

When the movable cam 41 is thus pushed, the resiliency of the pawl 43 enables it to ride over the engaging teeth 34 one tooth at a time, allowing the movable cam 41 to move up along the guide groove 35 (the cam surface 42), thereby increasing the overall length of the spacer S, until the spacer is at a length that fills the gap between the cabinet 51 and the flange 62. As shown in FIG. 19, the fixing screw 71 is then inserted through the long hole 45 and the hole 36 and screwed into the boss 53. This clamps the flange 62 between the spacer S and the screw 71, ensuring that the CRT 61 is attached securely to the cabinet 51.

The same effect that is obtained with the spacer S of the first embodiment can also be obtained with this spacer S of the second embodiment.

In the arrangement of the first embodiment described above, a ratchet mechanism is provided between the peripheral surfaces of the first and second cams 11 and 21. However, the same effect can be obtained by providing the ratchet means on the cam surfaces 14 and 24. Also, although in the case of the first and second embodiments, the fixed cams 11 and 31 are formed as parts that are separate from the cabinet 51, the fixed cams 11 and 31 can be formed as integral parts of the cabinet 51. The coupling means is not limited to the example configuration described with reference to the first and second embodiments. Instead, any configuration may be used that provides the same function.

As described in the foregoing, in accordance with this invention, a spacer is provided that is comprised of a first fixed cam and a second movable cam. It is noted that the first cam may be a movable one and the second cam may be a fixed one. The cams are moved relative to each other with the cam surfaces in mutual contact. This enables the overall length of the spacer to be increased, which is used to fill gaps when attaching a part, such as the gap between a CRT and a cabinet in which the CRT is attached. The spacer makes it possible to use screws to effect a strong, direct attachment of parts, without warping the cabinet or other such member to which the part is affixed.

A ratchet mechanism is provided that prevents the overall length of the spacer from decreasing, and the assembly state can be maintained. Since the cams can be cylindrically formed and the ratchet mechanism can be provided between the peripheral walls or cam surfaces of the cams, it is possible to provide a configuration that enables a ratchet mechanism to be added without increasing the overall size of the spacer.

The spacer can also be provided with a torque limiter that enables the overall length of the spacer to be readily increased to the appropriate length to fill the gap between the part and the member to which the part is attached.

A coupling means can be provided between the cams. This maintains the initial assembly state of the spacer, that is, it keeps the cams from separating, making the spacer easier to handle and to use for attaching parts.

What is claimed is:

1. A spacer for adjusting a spacing between a TV receiver cabinet and a cathode ray tube or CRT having a member, the spacer comprising:

a first cam having a first inclined cam surface and a first cylindrical portion;

a second cam having a second inclined cam surface abutting on the first inclined cam surface and a second cylindrical portion fitted on the first cylindrical portion;

a ratchet means comprising engaging teeth provided on a peripheral wall of the first cam and a pawl provided on a peripheral wall of the second cam, the pawl engaging with the engaging teeth of the ratchet means;

a torque limiter provided on a threaded engaging portion of the second cam, the torque limiter engaging with a fixing screw; and coupling means between the first and second cams for coupling the first and second cams together at least in an initial state of the first and second cams, the coupling means including a pawl located on the first cam and teeth located on the pawl of the second cam;

wherein a torque of a screwing action of the fixing screw relative to the threaded engaging portion is larger than a ratchet torque of the ratchet means, whereby relative movement between the first and second cams changes an overall length of the first and second cams, and when rotation of the fixing screw in the threaded engaging portion brings one of the first and second cams into contact with the member of the CRT, the torque limiter functions to screw the fixing screw into the threaded engaging portion.

2. A spacer for adjusting a spacing between a TV receiver cabinet and a cathode ray tube or CRT having a member, the spacer comprising:

a first cam having a first inclined cam surface and a first cylindrical portion;

a second cam having a second inclined cam surface abutting on the first inclined cam surface and a second cylindrical portion fitted on the first cylindrical portion;

a ratchet means comprising engaging teeth provided on the first inclined cam surface and a pawl provided on the second inclined cam surface, the pawl engaging with the engaging teeth;

a torque limiter provided on a threaded engaging portion of the second cam, the torque limiter engaging with a fixing screw; and coupling means between the first and second cams for coupling the first and second cams together at least in an initial state of the first and second cams, the coupling means including a pawl located on the first cam and teeth located on the pawl of the second cam;

wherein a torque of a screwing action of the fixing screw relative to the threaded engaging portion is larger than a ratchet torque of the ratchet means, and whereby relative movement between the first and second cams changes an overall length of the spacer, and when rotation of the fixing screw into the threaded engaging portion brings the second cam into contact with the member of the CRT, the fixing screw is fully screwed into the torque limiter of the threaded engaging portion of the second cam.

3. A structure for attaching a cathode ray tube or CRT, having a member, to a TV receiver cabinet, the structure comprising:

a first cam having a first inclined cam surface and a first cylindrical portion;

a second cam having a second inclined cam surface abutting on the first inclined cam surface and a second cylindrical portion fitted on the first cylindrical portion;

a ratchet means comprising engaging teeth provided on a peripheral wall of the first cam and a pawl provided on a peripheral wall of the second cam, the pawl engaging with the engaging teeth of the ratchet means;

a torque limiter provided on a threaded engaging portion of the second cam, the torque limiter engaging with a fixing screw; and coupling means between the first and second cams for coupling the first and second cams together at least in an initial state of the first and second cams, the coupling means including a pawl located on the first cam and teeth located on the pawl of the second cam, wherein a torque of a screwing action of the fixing screw relative to the threaded engaging portion is larger than a ratchet torque of the ratchet means, whereby relative movement between the first and second cams changes an overall length of the spacer, and when rotation of the fixing screw into the threaded engaging portion brings the second cam into contact with the member of the CRT, the fixing screw is fully screwed into the torque limiter of the threaded engaging portion of the second cam.

4. A structure for attaching a cathode ray tube or CRT, having a member, to a TV receiver cabinet, the structure comprising:

a first cam having a first inclined cam surface and a first cylindrical portion;

a second cam having a second inclined cam surface abutting on the first inclined cam surface and a second cylindrical portion fitted on the first cylindrical portion;

a ratchet means comprising engaging teeth provided on the first inclined cam surface and a pawl provided on the second inclined cam surface, the pawl engaging with the engaging teeth of the ratchet means;

a torque limiter provided on a threaded engaging portion of the second cam, the torque limiter engaging with a fixing screw;

coupling means between the first and second cams for coupling the first and second cams together at least in an initial state of the first and second cams, the coupling means including a pawl located on the first cam and teeth located on the pawl of the second cam;

wherein a torque of a screwing action of the fixing screw relative to the threaded engaging portion is larger than a ratchet torque of the ratchet means, whereby relative movement between the first and second cams changes an overall length of the spacer, and when rotation of the fixing screw into the threaded engaging portion brings the second cam into contact with the member of the CRT, the fixing screw is fully screwed into the torque limiter of the threaded engaging portion of the second cam.

* * * * *